United States Patent [19]

Major

[11] 3,789,146

[45] Jan. 29, 1974

[54] OVERLOAD MONITOR FOR TRANSMISSION SYSTEMS

[75] Inventor: Norman Lionel Major, Plaistow, N.H.

[73] Assignee: Bell Telephone Laboratories, Incorporated, Murray Hill, N.J.

[22] Filed: Nov. 20, 1972

[21] Appl. No.: 308,150

[52] U.S. Cl. .......................... 179/15 BF, 179/15 FD

[51] Int. Cl. .......................... H04j 1/16

[58] Field of Search ........ 179/15 BF, 15 FD, 15 AN

[56] References Cited

UNITED STATES PATENTS

| | | | |
|---|---|---|---|
| 3,548,105 | 12/1970 | Anderson | 179/15 BF |
| 3,586,993 | 6/1971 | Buck | 179/15 BF |

*Primary Examiner*—Ralph D. Blakeslee

*Attorney, Agent, or Firm*—John K. Mullarney

[57] ABSTRACT

A group of frequency division multiplexed signal channels is modulated by a swept frequency signal and the resultant modulated wave is delivered to a band-pass filter which serves to pass a narrow band of frequencies. In this manner the narrow band of the filter is effectively swept over the group of frequency multiplexed channels. A power detector monitors the filter output and if the same exceeds a given threshold level the sweep is interrupted and the narrow "slot" of the filter is caused to oscillate about the frequency of the detected power overload. After a short delay, loss is increasingly inserted into the transmission path until the overload is reduced to an acceptable level. The oscillation of the filter slot about the overload continues throughout this period of loss insertion, but in ever decreasing cycles (i.e., a homing operation is effected). When the overload is reduced to an acceptable level the homing operation is terminated and the sweep over said group of multiplexed channels thence proceeds.

8 Claims, 6 Drawing Figures

OVERLOAD MONITOR FOR TRANSMISSION SYSTEMS

BACKGROUND OF THE INVENTION

This invention relates to signal transmission monitoring systems and, more particularly, to an overload monitor for detecting the presence of overload signals in any channel of a group of frequency division multiplexed signal channels.

In sending voice and/or data signals over frequency division multiplexed transmission systems, it is usually necessary to specify maximum power limits. This signal power restriction is necessary to prevent excessive intermodulation and intelligible crosstalk. Signals whose sustained power spectra exceed this criteria are termed overload signals.

A common, if not most common, form of overload occurs when the signal produced by a subscriber's station set becomes excessive, either by accident or intent. In addition, narrow band overloads such as an unmodulated carrier in a data channel may produce excessive crosstalk and/or single frequency tone interference that exceed the design limits (i.e., allowable maximum power) of the transmission facility. Other single frequency or narrow band overloads caused, for example, by the "singing" of one or more repeaters also create crosstalk and intolerable interference which usually exceed the design limits.

To protect the transmission facility and the subscribers or users of the same it is of primary importance that overload signals be detected quickly. When the bandwidth of the spectrum being monitored is small, the rapid detection of an overload can be carried out in accordance with prior art techniques (e.g., see the patent to C. D. Anderson, U.S. Pat. No. 3,548,105, issued Dec. 15, 1970). Heretofore, however, when the bandwidth of the spectrum has been great (i.e., several megahertz), a rapid detection of overload has not been readily achieved.

It is accordingly a primary object of the present invention to detect quickly the presence of an overload signal in any channel of a wideband group of frequency division multiplexed signal channels.

Once an overload signal has been detected, it is obviously advantageous to identify the same, in frequency, and to take some corrective action. The prior art appears to deal with these tasks on a mutually exclusive basis (i.e., doing one or the other) and no attempt seems ever to have been made to integrate the same with each other and with the detection process. Moreover, the prior art solutions to these tasks have been quite rudimentary. For example, an overload signal is typically identified, in frequency, merely as lying within a given multiplexed signal channel; and, the corrective action, more often than not, comprises the generation of an alarm indication.

A related object of the invention, therefore, is to provide an integrated overload monitor circuit which automatically detects, suppresses and precisely identifies overload signals that may appear in a wideband spectrum of frequency multiplexed signal channels.

SUMMARY OF THE INVENTION

The above and other objects are obtained in accordance with the present invention wherein the narrow passband of a band-pass filter is effectively swept in frequency over a wideband spectrum of frequency multiplexed signal channels for the purpose of detecting the presence of sustained overload signals in any of the channels. The power output of the filter is continuously monitored and if the same exceeds a preselected threshold level the sweep is interrupted and an alternating sweep mode is effected wherein the narrow "slot" of the filter oscillates about the frequency of the power violator. Then after a short time delay, to discriminate for example between a sustained overload and a high-volume talker burst, loss is increasingly inserted into the transmission path until the power violator or overload is eventually reduced to an acceptable level. The oscillation of the filter slot about the frequency of a power violator continues throughout this period of loss insertion, but in an ever decreasing range of oscillations. That is, the loss insertion is accompanied by a homing operation in which the leading edge of the filter slot "homes-in" on the frequency of the power violator. When the power violator or overload is reduced to an acceptable level the homing operation is terminated and the sweep over the wideband spectrum thence proceeds. If a new and larger power violator is encountered the described operation will be repeated, with additional loss inserted into the transmission path.

An advantageous feature of the invention is that the above-described homing operation is sufficiently precise that a power violator can be identified to within ±1 kHz in a wideband frequency spectrum of at least 3 MHz.

BRIEF DESCRIPTION OF THE DRAWINGS

The invention will be more fully appreciated from the following detailed description when the same is considered in connection with the accompanying drawings in which.

DETAILED DESCRIPTION

Figure 1:
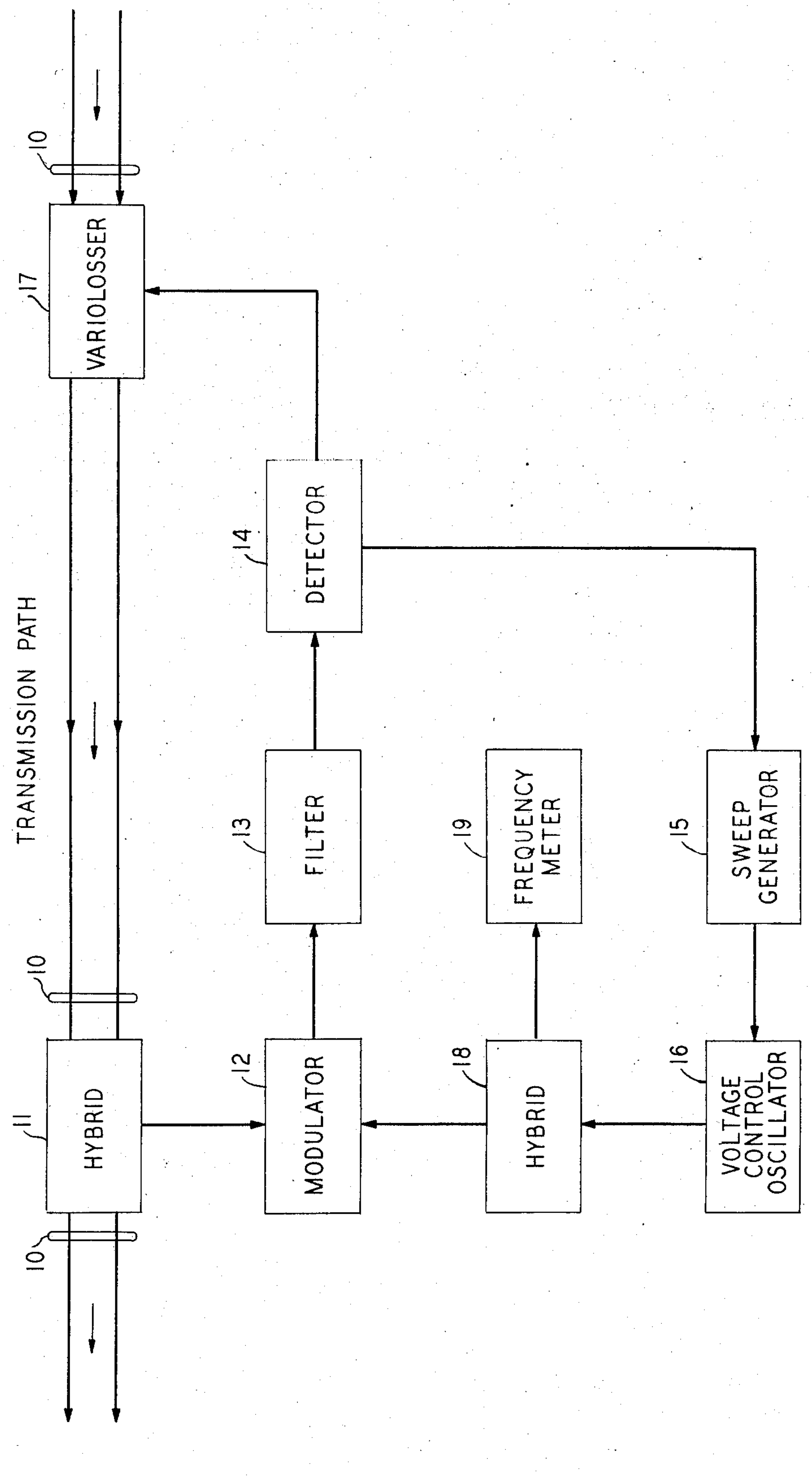
FIG. 1 shows a schematic block diagram of an overload monitor in accordance with the principles of the present invention.
Figures 2, 6:
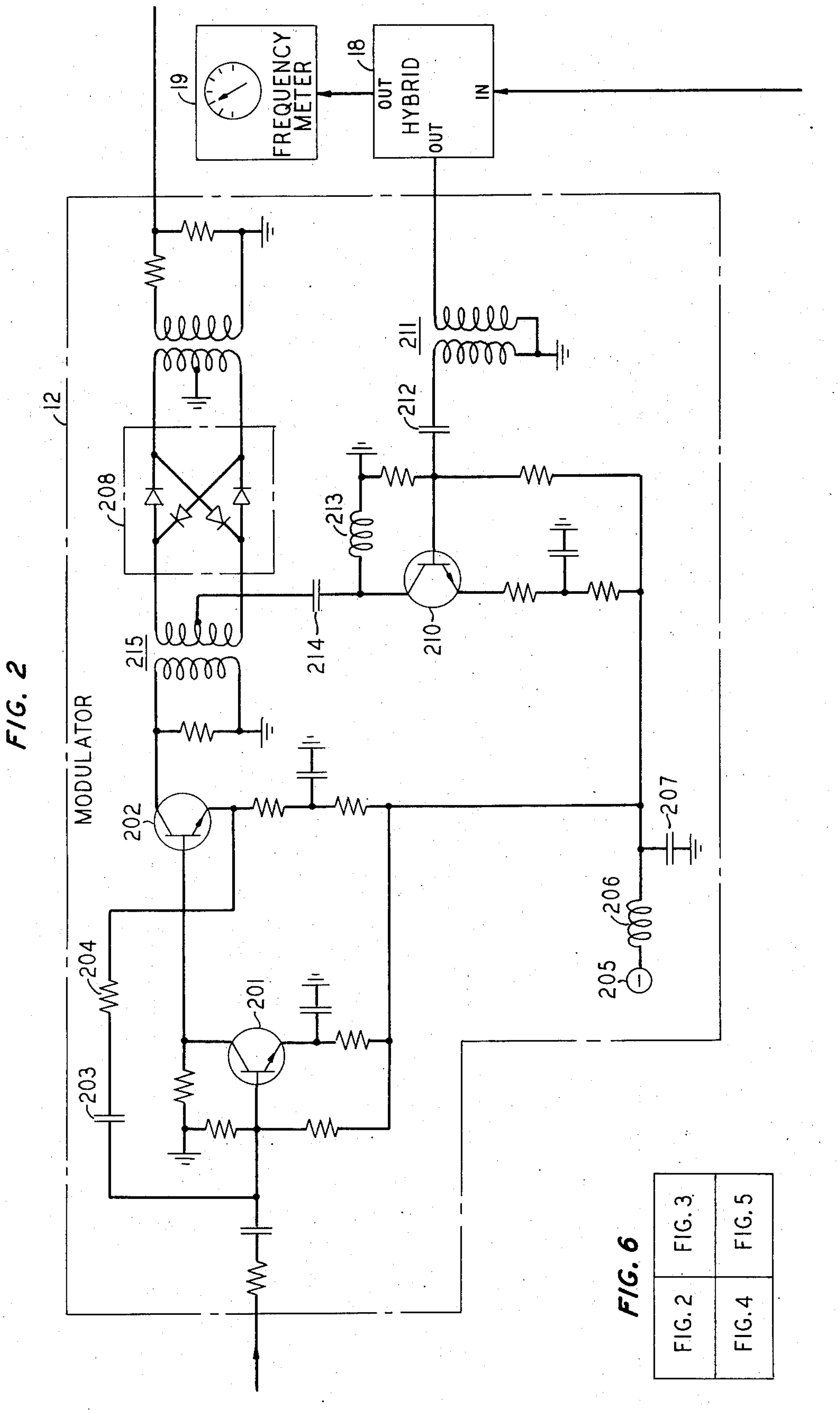
FIGS. 2 through 5, when arranged as shown in FIG. 6, show a detailed schematic drawing of the modulator, detector, sweep generator and voltage controlled oscillator circuits of FIG. 1.
Figure 3:
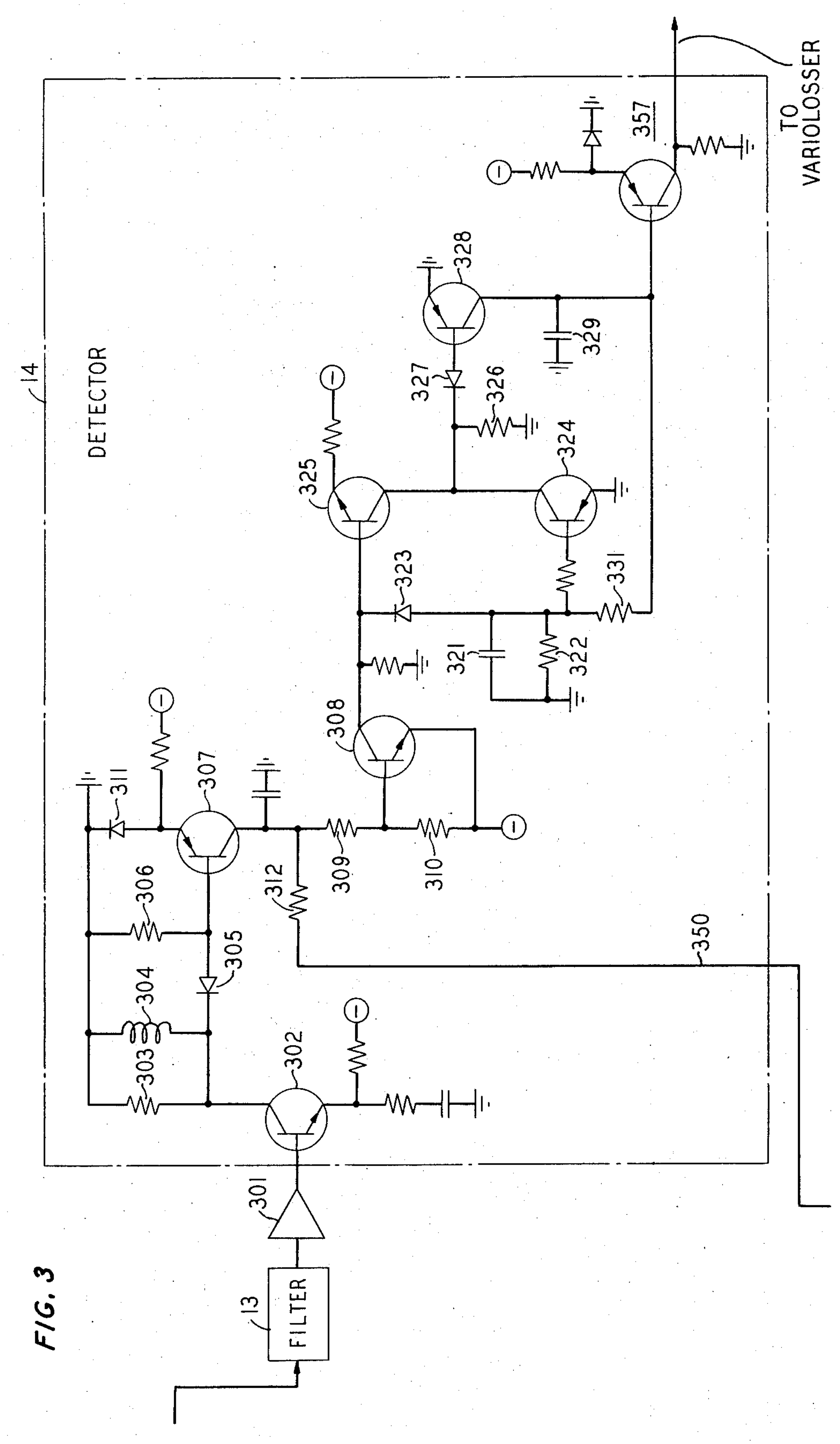

Turning briefly to FIG. 1 of the drawings, there is shown in schematic block form an overload monitor for detecting the presence of overload signals in any channel of a group of frequency division multiplexed signal channels. A wideband transmission facility, symbolically illustrated in FIG. 1 by the reference numeral 10, is utilized to convey the group of frequency multiplexed signal channels between remote locations. The overload monitor of the invention is intended for broadband surveillance (i.e., 3 MHz or more) and the transmission facility will typically comprise a high capacity broadband system, such as a radio relay or a coaxial cable system. The overload monitor of the invention, however, is in no way restricted thereto and it may be readily utilized with any transmission system irrespective of the bandwidth thereof. In a typical application of the invention, the overload monitor has been used advantageously to monitor a broadband group (i.e., 60 kHz to 3.084 MHz) of frequency multiplexed, 4 kHz signal channels. The overload monitor served to automatically detect, suppress and precisely identify (±1 kHz) overload signals without any intervention by an operator.

As shown in FIG. 1 the overload monitor of the invention comprises a modulator 12, a bandpass filter 13, a power detector 14, a sweep generator 15 and a voltage controlled oscillator 16 all connected in a loop configuration. The group of frequency multiplexed signal channels is coupled, via a conventional hybrid junction 11, to the modulator 12 along with a swept frequency signal derived from the voltage controlled oscillator (VCO) and the resultant modulated wave is delivered to the narrow band (4 kHz) filter 13. In this way the narrow band of the filter is effectively swept over the group of frequency multiplexed signal channels. The power detector 14 is coupled to the output of the filter 13 and, as the name implies, it detects when the signal in a 4 kHz band exceeds a preselected threshold level. If this threshold level is exceeded, an appropriate signal is sent to the sweep generator 15 to alter the sweep thereof. The sweep generator generates an exponential voltage which when coupled to the VCO causes a linear sweep of the frequency of the latter. It is this linearly swept frequency that is coupled to the modulator 12 for the purpose of effectively sweeping the 4 kHz "slot" of the narrow band filter 13 over the group of frequency multiplexed signal channels.

The relative sweep of the 4 kHz filter slot over the broadband group of frequency multiplexed channels is a continuous, repetitive one. However, when a power violator or overload is detected during a sweep, the power detector 14 delivers an appropriate signal to the sweep generator 15 to reverse the direction of sweep. The 4 kHz slot is thus effectively "backed-off" from the violator until the latter once again falls outside the 4 kHz slot. At this time the direction of the sweep will again be reversed, the power violator will again be detected, the sweep direction once again reversed — and so on. Thus the 4 kHz slot of the filter in effect oscillates about the frequency of the power violator. This oscillation continues for a short predetermined period of time, to discriminate for example between a sustained overload and a high-volume talker burst, after which current is delivered to the variolosser 17 causing loss to be inserted in the transmission path. Loss is increasingly inserted into the transmission path until the power violator or overload is eventually reduced to an acceptable level. The sweep of the 4 kHz filter slot over the group of multiplexed signal channels thence proceeds and if a new and larger power violator should now be encountered the above-described operation will be repeated, with additional loss inserted into the transmission path.

The described oscillation of the 4 kHz filter slot about the frequency of a power violator continues throughout the period of loss insertion, but in an ever decreasing range of oscillations. That is, the VCO control loop action is such that the leading edge of the 4 kHz slot "homes-in" on the frequency of the power violator. This homing operation has been found to be sufficiently precise that a power violator can be identified to within ±1 kHz in a broadband group covering a frequency range greater than 3 MHz.

The hybrid circuit 18 serves to couple a portion of the swept frequency signal of the VCO to the meter 19 for frequency identification purposes.

The variolosser 17 may be of a conventional design comprising, for example, a simple shunt thermistor which loads down the transmission path to achieve loss. Such a variolosser circuit has been found to be capable of varying its loss at least 20 dB for a d.c. current of approximately 20 mA fed to the same.

The overload monitor of the invention is shown in greater detail in the schematic circuit diagram of FIGS. 2 through 5. The monitor circuitry includes both conventional as well as unique circuit configurations. Accordingly, and for the sake of brevity, the state-of-the-art circuits will be described only briefly, while the circuits considered novel will be particularized. Turning thus to FIGS. 2 through 5, and first to the modulator 12 shown in FIG. 2, the group of frequency multiplexed signal channels is coupled to an input signal amplifier comprising *n-p-n* transistors 201 and 202. The collector of transistor 201 is directly connected to the base of transistor 202, while the capacitance 203 and resistance 204 provide a shunt type negative feedback from the emitter of transistor 202 to the base of transistor 201. The operating potential for these stages is derived from a negative (−24 V) source 205 via a filtering circuit consisting of inductance 206 and capacitance 207. The output of the signal amplifier is transformer-coupled to the double balanced, diode ring modulator 208. The other input to the modulator 208 is derived from the collector of the *n-p-n* transistor 210 of the carrier amplifier circuit. The swept frequency carrier signal, derived from the VCO 16 in a manner to be described, is coupled via the transformer 211 and capacitance 212 to the base of transistor 210. The inductance 213 serves as the collector load and it permits a zero d.c. voltage at the collector of transistor 210. The amplified carrier signal is coupled by capacitance 214 to the center tap of the secondary of transformer 215. The diode ring modulator 208, and the input signal and carrier amplifier circuits are quite conventional and further description thereof is not believed warranted.

The output of the modulator 12 comprises the sum and difference signals of the modulation process and these are coupled to the band-pass filter 13 which is designed to provide a narrow passband (i.e., 4 kHz) centered at a frequency of 8.142 MHz. The output of the filter 13 is then coupled by the amplifier 301 to the power detector 14 for the purpose to be described.

Figure 4:
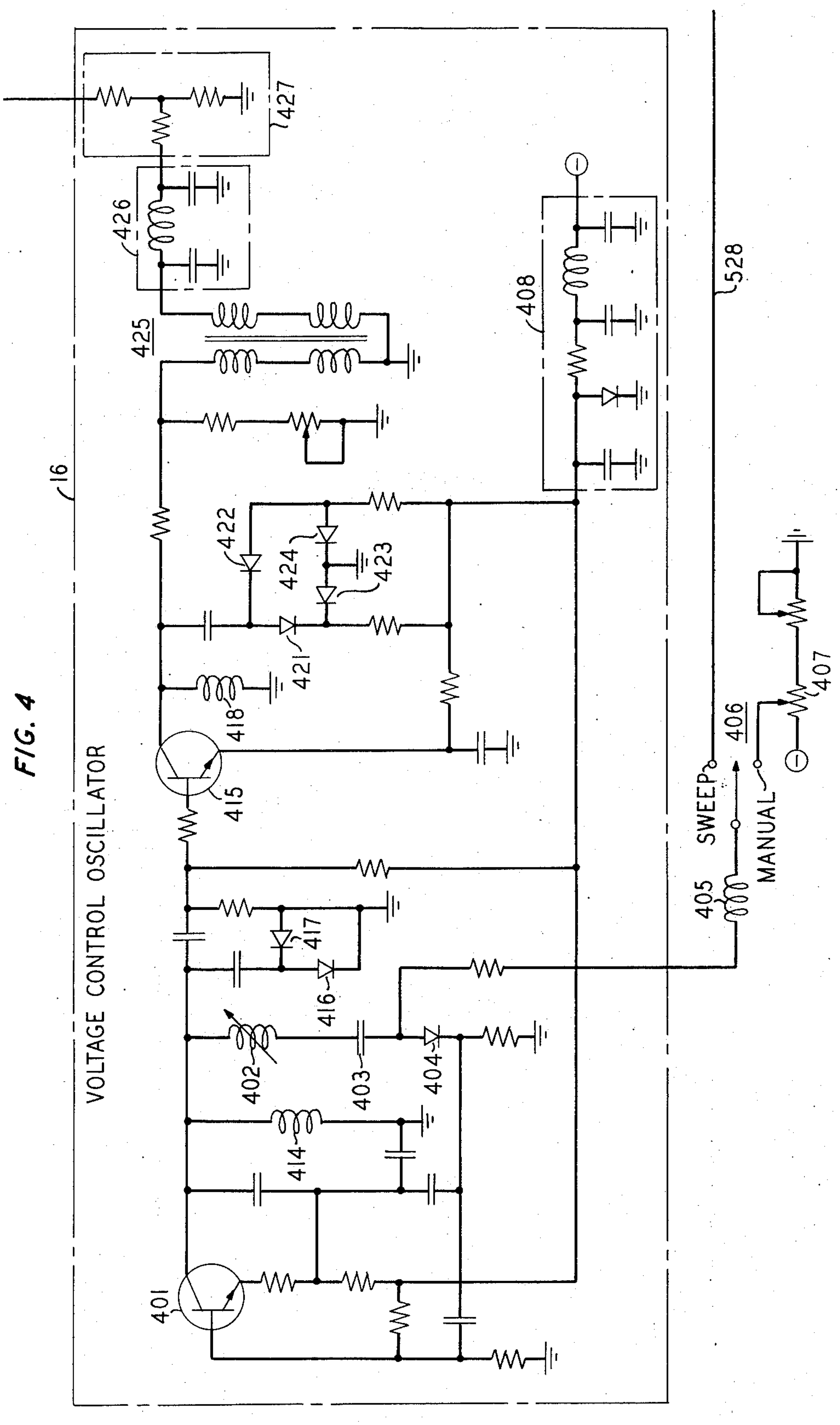
Figure 5:
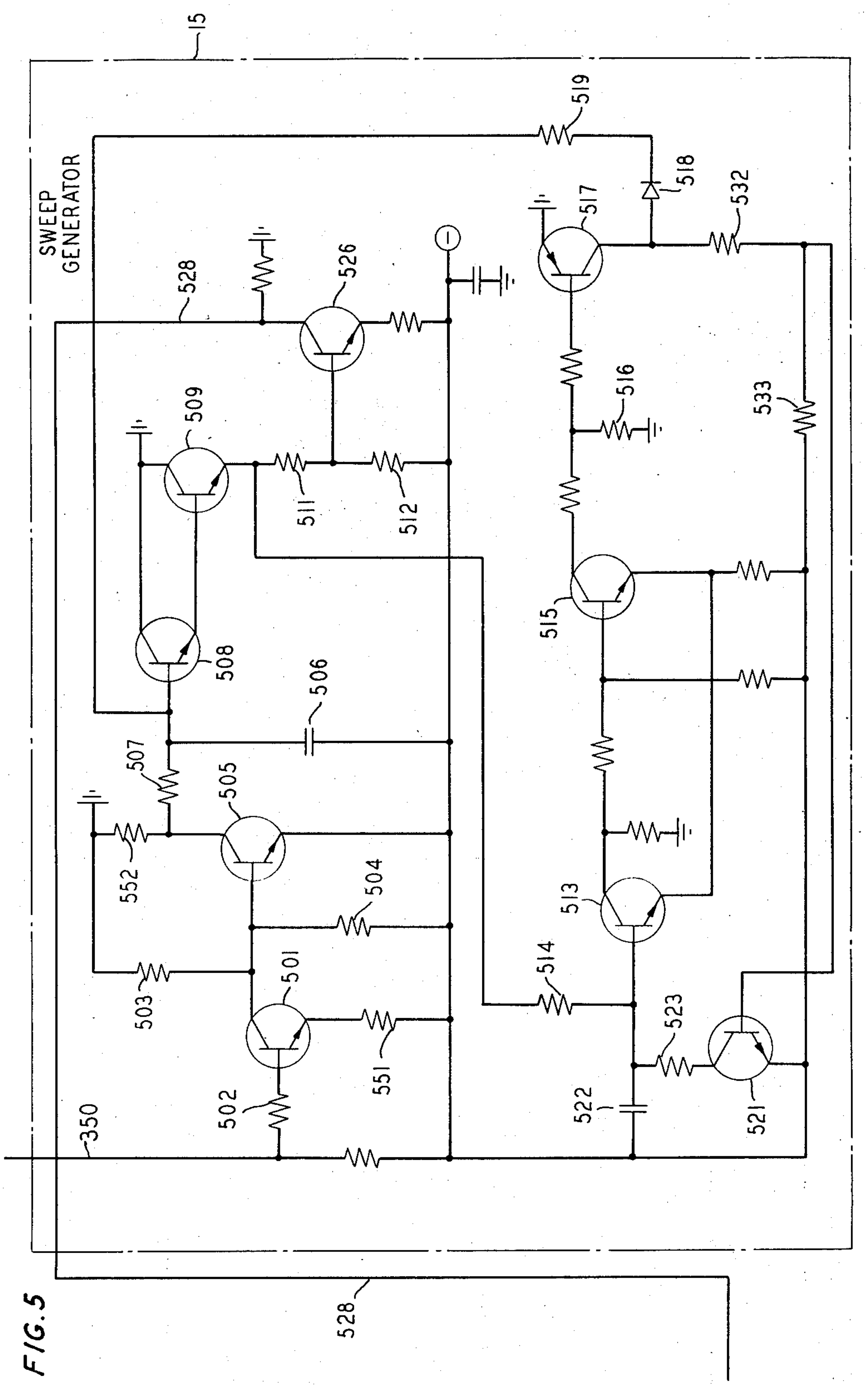

The swept carrier signal utilized in modulator 12 is developed by the voltage controlled oscillator circuit 16 of FIG. 4. The VCO 16 comprises an *n-p-n* transistor 401 connected in a typical Clapp oscillator configuration. As known to those in the art, a Clapp oscillator is a modified Colpitts which makes use of a series-tuned LC circuit (i.e., inductance 402 and capacitance 403). The varactor diode 404 is series connected with this series-tuned LC circuit and it serves to vary the oscillator frequency. The carrier of the oscillator is linearly swept in frequency by a varying exponential voltage applied to the varactor. This latter voltage is derived from the sweep generator 15 and it is delivered to the varactor 404 via the isolation inductance 405 and the "sweep" contacts of manual switch 406. The sweep generator 15 develops a voltage which varies exponentially from a negative 20 volts to about zero and when this voltage is fed to the varactor 404 it causes the frequency of the oscillator to be linearly swept from approximately 11.3 to 8.2 MHz. The switch 406 is normally closed in the "sweep" position. For testing purposes, however, it may be desirable to manually control the frequency of the VCO by closing the "manual" contacts of switch 406 and varying potentiometer 407. The circuit package 408 provides isolation, filtering and voltage regulation of the biasing potential prior to the delivery of the same to the transistor circuits of the VCO. The inductance 414 serves as the collector load of transistor 401 and it permits a zero d.c. voltage at the collector.

The output of the Clapp oscillator circuit is coupled to the base of the *n-p-n* transistor 415, which is connected in a fairly conventional amplifier circuit configuration. The diodes 416 and 417 provide a standard amplitude limiting function. The inductance 418, here again, serves as a collector load and it permits a zero d.c. potential at the collector. The diodes 421 – 424 (diodes 421 – 423 are regular silicon diodes, while diode 424 is a zener) are connected in a known configuration to provide additional amplitude limiting and a degree of temperature stabilization. The amplified swept carrier signal is then coupled via the transformer 425, low pass filter 426 (3 dB cutoff at 11.5 MHz) and terminating resistance pad 427 to the input of the hybrid junction 18. The above-described circuitry of the VCO 16 is admittedly conventional and therefore does not warrant further detailed description herein.

To summarize the circuit description thus far, the sweep generator circuit 15 produces an exponentially varying analog voltage (−20 to 0 volts) which is delivered to the varactor 404. The varactor is series connected to the series-tuned resonant circuit (i.e., inductance 402 and capacitance 403) of the Clapp oscillator and it serves to linearly vary the frequency of the latter in response to the applied exponential voltage. Thus, a carrier signal is produced that is swept in frequency from approximately 11.3 to 8.2 MHz. The swept frequency signal of the VCO is delivered to the diode ring modulator 208 along with the group of frequency multiplexed signals under surveillance. The resultant modulated output signals are coupled to the filter 13, which has a narrow 4 kHz passband centered at 8.142 MHz.

More particularly, and in accordance with a typical application of the invention, the overload monitor has been used advantageously to monitor a wideband spectrum of frequency multiplexed signals extending from 60 kHz to 3.084 MHz. A single 4 kHz slot (8.140 to 8.144 MHz) of the modulated output signal is selected by the filter 13. The output of modulator 12 comprises both the sum and difference products of modulation and it is the difference signal that is utilized for present purposes, although the sum signal could also have been used. Now, as will be evident to those in the art, if the carrier signal of the VCO is swept in frequency from 11.228 to 8.200 MHz, successive segments of the wideband signal spectrum will be selected by the filter 13, e.g., 11.228 MHz − 8.144 MHz = 3.084 MHz, where 8.144 MHz is the upper frequency of the filter passband. Thus, the narrow passband of the filter 13 is effectively swept in frequency over the wideband spectrum. And with no overload signals, the wideband spectrum will be continuously and repetitively swept in the described manner.

The power detector 14 is coupled to the output of the filter 13, via the isolation amplifier 301, and it detects when the signal in a 4 kHz band exceeds a preselected threshold level. The amplitude of the swept carrier signal, delivered to the modulator 12, is held constant, in the manner heretofore described, and therefore variations in the power output of the filter 13 are a direct reflection of power variations that are encountered in the monitored wideband spectrum. If and when an overload signal is met during a sweep, the aforementioned preselected threshold level will be exceeded and an appropriate signal sent to the sweep generator 15 to alter the sweep thereof.

The power detector 14 comprises a detector drive amplifier comprised of *n-p-n* transistor 302. The shunt coupled resistance 303 and inductance 304 serve as the collector a.c. load impedance and the inductance 304 permits a zero d.c. potential at the collector. Rectifying diode 305 develops a half-wave rectified signal across the resistance 306. The *p-n*-p transistor 307 is normally in a cutoff condition, as is the transistor 308. Accordingly, there is no current flow through the resistances 309 and 310 and the voltage at the collector of transistor 307 is equal to the source potential. The biased zener diode 311 sets the threshold level at which transistor 307 conducts. Disregarding the relatively small emitter-base barrier potential of transistor 307, it will be evident that when the rectified voltage across resistance 306 exceeds the reference threshold voltage (e.g., −4 V) set by the zener diode 311, the transistor 307 will conduct. And this conduction will be indicative of the fact that an overload signal has been encountered. The voltage at the collector of the conducting transistor 307 now approximates that of the emitter (e.g., −4 V) and, as a consequence, a positive-going voltage step is delivered to the sweep generator 15, of FIG. 5, via the resistance 312.

The magnitude of the rectified signal developed across resistance 306 is directly related to the signal power encountered during the sweep of the wideband signal spectrum. By adjustments of circuit gain and/or impedance adjustments, the overload monitor circuit is initially calibrated so that overload transmission signals at the threshold of objectionability serve to trigger the transistor 307 into conduction.

The collector of transistor 307 is connected to the base of the *n-p-n* transistor 501, of the sweep generator 15, via the resistance 312, lead 350 and resistance 502. In the absence of an overload signal the voltage at the collector of transistor 307 is equal to the source potential (−24 V) and this serves to bias the transistor 501 to cutoff. With the transistor 501 at cutoff, the voltage divider comprised of resistances 503 and 504 serves to bias the transistor 505 to its "on" condition. The transistor 505 is connected in shunt with the RC charging circuit comprised of capacitance 506 and resistance 507. This RC circuit serves to generate the exponential voltage that is used to linearly sweep the frequency of the VCO 16. To this end, the capacitance and resistance should both be large (e.g., 4 $\mu$F and 360 K). The capacitance 506 is charged rapidly, in a manner to be described, and then it discharges exponentially through the large resistance 507 and the conducting transistor 505. The transistors 508 and 509 are connected in a Darlington emitter-follower configuration; hence, transistors 508 and 509 present a very high impedance (e.g., 20 megohms) to the capacitance 506 so that there is negligible leakage current therethrough. The voltage across the series connected, emitter resistances 511 and 512 "tracks" or follows the voltage across the capacitance 506, disregarding, of course, the small voltage drop contributed by the transistors 508 and 509. The voltage at the emitter of transistor 509 is delivered to the base of transistor 513 via the resistance 514. The *n-p-n* transistors 513 and 515 are connected in a Schmitt trigger configuration. Throughout the period that the capacitance 506 is exponentially discharging, the potential applied to the baSe of transistor 513 maintains the same in the state of conduction. The transistor 515 is, of course, cutoff during the period that the transistor 513 conducts, and vice versa.

The capacitance 506 discharges exponentially until the charge thereacross approximates zero volts. The voltage across the series connected resistances 511 and 512 follows the voltage drop across the capacitance 506 and therefore when the latter drop is approximately zero. the voltage at the emitter of transistor 509 will be about equal to the source potential (−24 V). At this time, the transistor 513 of the Schmitt trigger circuit is driven to cutoff and the transistor 515 is concomitantly turned "on." With the transistor 515 now conducting, the voltage drop across the resistance 516 serves to turn "on" the normally non-conducting *p-n-p* transistor 517. The collector of transistor 517 is coupled to the capacitance 506 via the diode 518 and the relatively small resistance 519 (e.g., 1.2 K). Thus, the collector of the conducting transistor 517 is now essentially at zero or ground potential and, as a result, the diode 518 conducts current so as to rapidly charge the capacitance 506. Since the only resistance in the charging path of the capacitance 506 comprises the small resistance 519 and the resistance offered by the conducting transistor 517 and diode 518, it will be clear that the capacitance 506 is charged (to approximately 24 volts) very quickly. The voltage drop across the series connected resistances 511 and 512 follows the charge across the capacitance 506 and, therefore, it might be expected that the transistor 513 would be quickly turned on. However, the base of the *n-p-n* transistor 521 is connected to the junction point of the resistances 532 and 533, which serve as the collector load for transistor 517. Thus, when the transistor 517 is driven to conduction, the transistor 521 also conducts. The conducting transistor 521 serves to charge the small (.1 μF) capacitance 522 and it temporarily establishes, in combination with the resitances 514 and 523, a voltage divider circuit. The voltage divider comprised of resistances 514 and 523 (514 = 17.5 K and 523 = 1.7 K) in combination with the small capacitance 522 serve to maintain the transistor 513 in a cutoff condition for a short predetermined time period so as to insure a complete charging or capacitance 506. The capacitance 522 discharges fairly rapidly and, at this time, the state of the Schmitt trigger circuit reverts to its former condition. That is, the transistor 513, once again, conducts current and the transistor 515 is cutoff. With the cutoff of transistor 515, the transistor 517 is also cutoff thereby terminating the charging of capacitance 506. The transistor 521 is also returned to cutoff at this time. The charged capacitance 506 begins again to discharge exponentially through the resistance 507 and the transistor 506, and the above-described operation is repeated.

A portion of the exponentially varying voltage that appears across the resistances 511 and 512 is coupled to the base of the *n-p-n* transistor 526, which is connected in a common-emitter configuration. The voltage at the collector of transistor 526, in turn, varies exponentially from a negative 20 volts to approximately zero volts and this exponential signal is delivered to the varactor 404 of the VCO via the lead 528.

The end result of the foregoing circuit operation is that the narrow band (i.e., 4 kHz slot) of the filter 13 is effectively swept over the group of frequency multiplexed signal channels in a continuous and repetitive fashion. Now, should a power violator or overload be encountered during a given sweep, the rectified voltage developed across the resistance 306 will exceed the reference threshold voltage set by the zener diode 311 and the transistor 307 will conduct. The voltage at the collector of the conducting transistor 307 approximates that of the emitter (e.g., −4 V) and, as a consequence, the transistor 501 of the sweep generator 15 is turned "on." The conducting transistor 501 and its small emitter resistance 551 present a low impedance shunt path at the input of transistor 505 and the latter transistor is thence cutoff. The result of this cutoff is twofold. The capacitance 506 can, of course, no longer discharge through transistor 505, but rather it now begins to charge through the resistance 552. The value of the resistance 552 is relatively small (e.g., 10 K) compared to the resistance 507 and, therefore, the rate of charge of capacitance 506 is now essentially the same as its rate of discharge. This latter charging is also an exponential one.

The change from an exponential discharge of capacitance 506 to an exponential charge of the same results, of course, in a reversal of the sweep signal delivered to the VCO and a reversal in the direction of the sweep of the oscillator carrier signal. Accordingly, the relative sweep of the 4 kHz filter slot over the wideband spectrum is reversed in direction and the filter slot is thereby effectively backed-off from the power violator until the latter falls outside the 4 kHz slot. As a result of this back-off, the transistor 307, of the power detector 14, reverts to its cutoff condition and this causes the transistor 501, of the sweep generator 15, to be cutoff and the transistor 505 thereby turned "on." The capacitance 506 then begins, once more, to discharge through the transistor 505 and hence the direction of sweep of the filter slot is again reversed. The power violator is once more detected, in the above-described manner, the sweep direction will again be reversed, and so on. Thus, the 4 kHz slot of the filter, in effect, oscillates about the frequency of the power violator. This oscillation of the filter slot about a power violator occurs at a relatively high rate; for example, for a 7 dB overload the oscillation will be at a rate of approximately 150 oscillations or cycles per second.

When a power violator has been encountered during a sweep and the transistor 307 thereby driven into conduction, the current flow through resistance 310 serves to turn "on" the *n-p-n* transistor 308. The capacitance 321 and resistance 322 are shunt-connected and coupled via the isolating diode 323 to the collector of transistor 308. The conducting transistor 308 develops a voltage (approximately −24 V) across the resistance 322 which serves to drive the *p-n-p* transistor 324 into conduction. Normally, i.e., in the absence of an overload, the transistor 324 is cutoff, while the *n-p-n* transistor 325 conducts. The conduction current of transistor 325 develops a potential across resistance 326 which causes the diode 327 and *p-n-p* transistor 328 to conduct. The conducting transistor 328 serves, in the absence of an overload, to shunt the capacitance 329 so as to prevent the same from charging. However, when an overload has been encountered, the voltage drop across resistance 322 causes the transistor 324 to conduct and it provides a low impedance path to ground which shunts resistance 326. As a result, the transistor 328 is cutoff and no longer "short-circuits" the capacitance 329.

The capacitance 329 and resistance 331 constitute an RC charging circuit for achieving a predetermined time delay prior to the delivery of a loss-inducing current to the variolosser 17. The voltage drop that appears across resistance 322, during the time that the transistor 308 is conducting, serves to charge the capacitance 329 through the large resistance 331. Now, as will be recalled, the transistor 307 and hence the transistor 308 will be successively turned "on" and "off" as the 4 kHz slot of the filter oscillates about the frequency of a power violator. The capacitance 321 in shunt with resistance 322 provides a "holding" action so as to deliver a more-or-less, short-term, steady state current to the RC charging circuit comprised of capacitance 329 and resistance 331. Each time the transistor 308 is cutoff the capacitance 321 tends to discharge through the resistance 322 but the time constant of this latter RC circuit is somewhat greater than a period of oscillation of the filter slot about the violator. Accordingly, a substantially steady-state continuous voltage is delivered to the resistance 331 – capacitance 329, RC charging circuit throughout the period of oscillation of the filter slot about a violator. The capacitance 329 will thus continue to charge until the voltage thereacross reaches a preselected threshold level determined by the threshold circuit 357. When this threshold is reached the transistor of circuit 357 conducts and a loss-inducing current is then delivered to the thermistor of the variolosser 17. The threshold circuit 357 is of the same circuit configuration as the threshold circuit comprised of transistor 307.

The resistance 331 and capacitance 329 provide a time delay between the time and overload is encountered during a given sweep and the introduction of loss into the transmission path. This delay can be of any magnitude, for any desired purpose — such as to discriminate between an overload and a high-volume talker burst, to satisfy particular communications specifications, etc. Any given amount of time delay can be achieved by the appropriate choice of values for capacitance 329 and resistance 331. For example, with a capacitance of 25 $\mu$F and a resistance of 162 K, a time delay of up to 3 seconds can be obtained.

Loss is continuously introduced into the transmission path until the power violator is reduced to an acceptable level. At this time, the current delivered to the variolosser 17 is terminated, the oscillation of the filter slot about the violator ends, and the sweep over the wideband spectrum thence proceeds, all in the manner to be described.

Once an overload or power violator has been encountered during a sweep, the above-described oscillations of the filter slot about the overload continue until the latter is effectively reduced to an acceptable level by the action of the variolosser. However, as loss is continually introduced into the transmission path, the range of the aforementioned oscillations continues to decrease. When an overload signal is present during a given sweep, the leading edge of the filter slot approaches and then sweeps past the same, i.e., the overload must, of necessity, "travel" into the slot so as to be detected by the power detector 14 coupled to the filter output. And, the extent of this travel is directly related to the magnitude of overload energy. Now as loss is increasingly inserted into the transmission path the overload energy is continually reduced and the aforementioned travel is also continally reduced. That is, the range or extent of the oscillations of the leading edge of the filter about the overload signal decreases as the magnitude of the latter is reduced. Thus, the leading edge of the filter slot, in effect, "homes-in" on the frequency of the overload signal.

The hybrid circuit 18 couples a portion of the swept frequency signal of the VCO to the frequency meter 19. The meter 19 actually measures the instantaneous frequency of the swept carrier signal of the VCO, but since this carrier frequency is offset from the signal channel frequency by a known amount, the frequency meter can be readily calibrated in terms of signal frequency. The meter 19 is read at the time that the above-described homing operation terminates so as to precisely identify (± 1 kHz) the frequency of the power violator.

After the power violator has been reduced to an acceptable level, and identified in frequency, all in the manner described, the threshold detection transistor 307 will for the time being remain in its cutoff condition, the transistor 501 of the sweep generator 15 will therefore also be cutoff and, as a consequence, the transistor 505 will continue to conduct so as to permit the capacitance 506 to discharge therethrough. This discharge of capacitance 506 reinstitutes the sweep of the wideband spectrum. If a new and larger power violator is now encountered the described operation will be repeated, with additional loss inserted into the transmission path.

With the threshold detection transistor 307 in cutoff, the transistor 308 will likewise be cutoff. The hold capacitance 321 thus discharges, fairly quickly, through the resistance 322. After a short period, determined by the time constant of this latter RC network, the transistor 324 is returned to cutoff and the transistor 328 conducts, once again, so as to short-circuit and thus discharge capacitance 329. This, of course, terminates the drive current to the variolosser 17.

Once the variolosser drive current is terminated the loss introduced into the transmission path begins to fall-off, more-or-less slowly depending upon the design of the variolosser circuit. Some fall-off is, of course, necessary, but too rapid a fall-off would be self-defeating. To this end, a low level "hold" current can be introduced to slow this fall-off in variolosser loss. For example, the abrupt termination of the aforementioned drive current can be used (by differentiation) to trigger a circuit (e.g., monostable multivibrator) which delivers a low level d.c. current (e.g., 2 mA) to the variolosser for a predetermined period at least equal to the time of a wideband spectrum sweep. In any event, because of the rapidity of the sweep, an overload signal is not allowed to return to anything near its former magnitude before being encountered, once again, in the next succeeding sweep of the wideband signal spectrum.

While no mention has been made heretofore about alarms, it will be obvious to those in the art that the drive current delivered to the variolosser 17, by the power detector 14, can also be used to give an alarm indication. This is a well known expedient in the art.

The various frequency values recited in the specification (e.g., a broadband spectrum of 60 kHz to 3.084

MHz) are only by way of example and it should be clear that the invention is in no way limited thereto. Likewise, for the indicated voltage values. The transistor types shown in the drawings are also by way of illustration only, it being clear to those in the art that *p-n-p* transistors can generally be substituted for *n-p-n* transistors and vice versa, with due regard, of course, to the polarities of the direct current potential sources. It is to be understood, therefore, that the foregoing disclosure relates to only a preferred embodiment of the invention and that numerous modifications or alterations may be made therein without departing from the spirit and scope of the invention.

What is claimed is:

1. A system for monitoring overload power signals which may appear in any channel of a group of frequency division multiplexed signal channels comprising band-pass filter means serving to pass a narrow band of frequencies, means for effectively sweeping said narrow band over said group of frequency multiplexed signal channels, means for measuring the power output of said filter means for the purpose of detecting overload power signals, sweep control means for interrupting the sweep of said narrow band when said power output exceeds a preselected threshold level and for effecting an alternating sweep mode wherein said narrow band oscillates about the frequency of a detected power overload, and means responsive to the detection of a power overload for increasingly inserting loss into the transmission path of said signal channels until the detected overload is reduced to an acceptable level.

2. A system as defined in claim 1 wherein said sweep control means serves to decrease the range of oscillations about the frequency of a detected overload as loss is increasingly inserted into the transmission path.

3. A system as defined in claim 2 including means for providing a measure of the frequency of a detected power overload.

4. A system as defined in claim 3 including means for delaying the insertion of loss into the transmission path for a predetermined period of time.

5. A system as defined in claim 4 wherein said narrow band is linearly swept over said group of frequency multiplexed signal channels.

6. An overload monitoring system for detecting, suppressing and identifying overload power signals which appear in any of the channels of a group of frequency division multiplexed signal channels comprising a modulator, means for coupling said group of frequency multiplexed signal channels to the input of the modulator, a band-pass filter connected to the output of the modulator and serving to pass a narrow band of frequencies, oscillator means for delivering a carrier signal to the input of the modulator, means for varying the frequency of said carrier signal over a given frequency spectrum to thereby effectively sweep the narrow band of the band-pass filter over the group of frequency multiplexed signal channels, means for comparing the power output of said filter to a preselected threshold level so as to detect overload power signals, sweep control means responsive to the detection of an overload signal by the comparing means to interrupt the sweep of said narrow band and to effect an alternating sweep mode wherein the narrow band of the filter oscillates about the frequency of a detected overload signal, and overload suppression means also responsive to said detection of an overload signal for inserting loss into the transmission path of said signal channels until the detected overload signal is reduced to an acceptable level, said sweep control means being responsive to said loss insertion to cause the leading edge of the swept passband of the filter to home-in on the frequency of the detected overload signal.

7. An overload monitoring system as defined in claim 6 wherein said sweep control means serves to terminate the homing operation and reinstitute the sweep of the narrow band of the filter over the group of signal channels when the detected overload signal is reduced to an acceptable level.

8. An overload monitoring system as defined in claim 7 including means for providing a measure of the frequency of a detected overload signal.

* * * * *